UNITED STATES PATENT OFFICE.

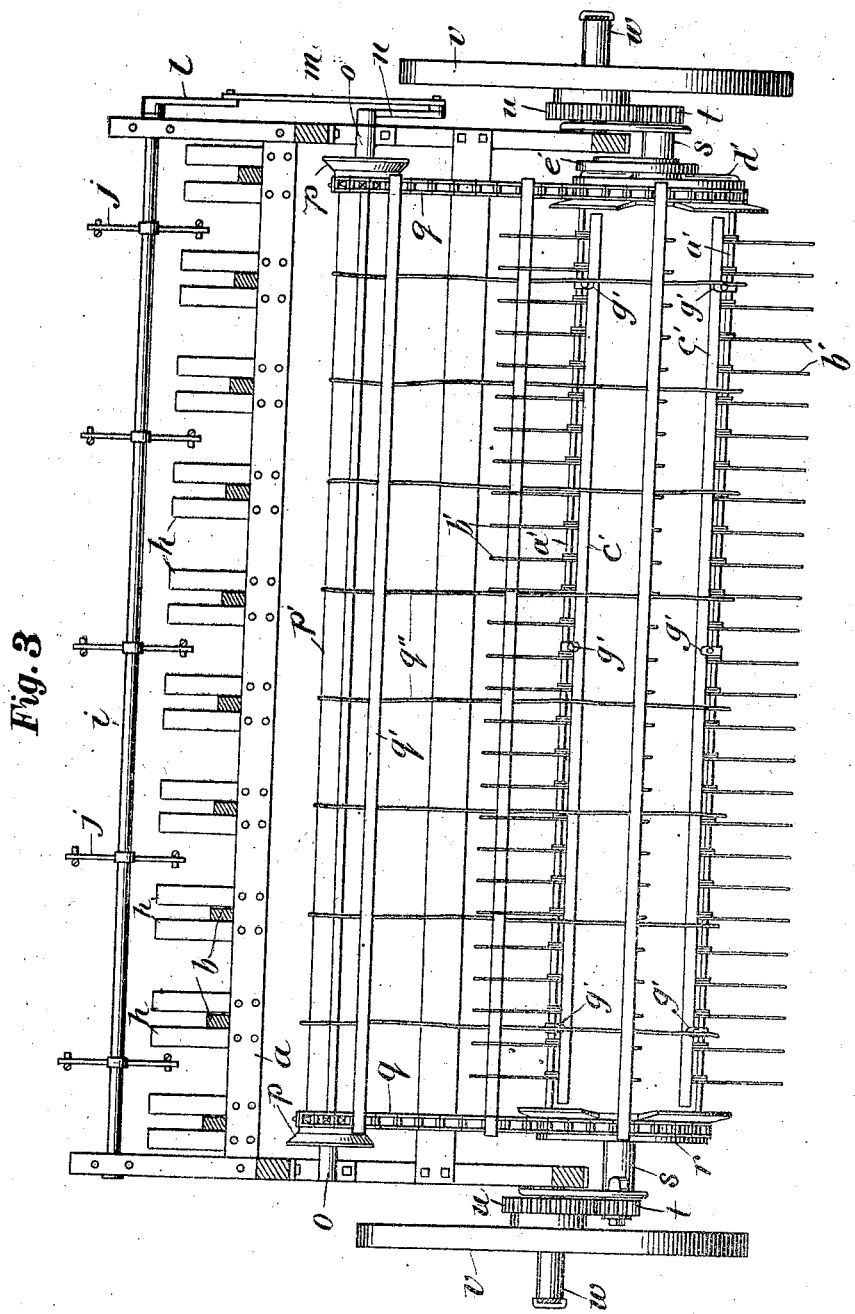

EDWARD A. JOHNSTON, OF STERLING, ILLINOIS.

HAY-LOADER.

No. 812,793.

Specification of Letters Patent.

Patented Feb. 13, 1906.

Application filed July 29, 1905. Serial No. 271,822.

*To all whom it may concern:*

Be it known that I, EDWARD A. JOHNSTON, a citizen of the United States, residing at Sterling, county of Whiteside, State of Illinois, have invented certain new and useful Improvements in Hay-Loaders; and I do hereby declare the following to be a full, clear, and exact description of the invention, such as will enable others skilled in the art to which it appertains to make and use the same.

The invention relates to hay-loaders, and has for its object to provide a simple, practical, and efficient machine to gather the hay from the ground as left by the mower and load it upon the wagon to which the machine is attached.

To this end the invention comprises an inclined deck having oppositely-reciprocating rakes operating over the same, a rotary gathering-cylinder taking the hay from the ground, and a conveyer between the deck and the gathering-cylinder for delivering the hay to the rakes on the deck.

Figure 1:
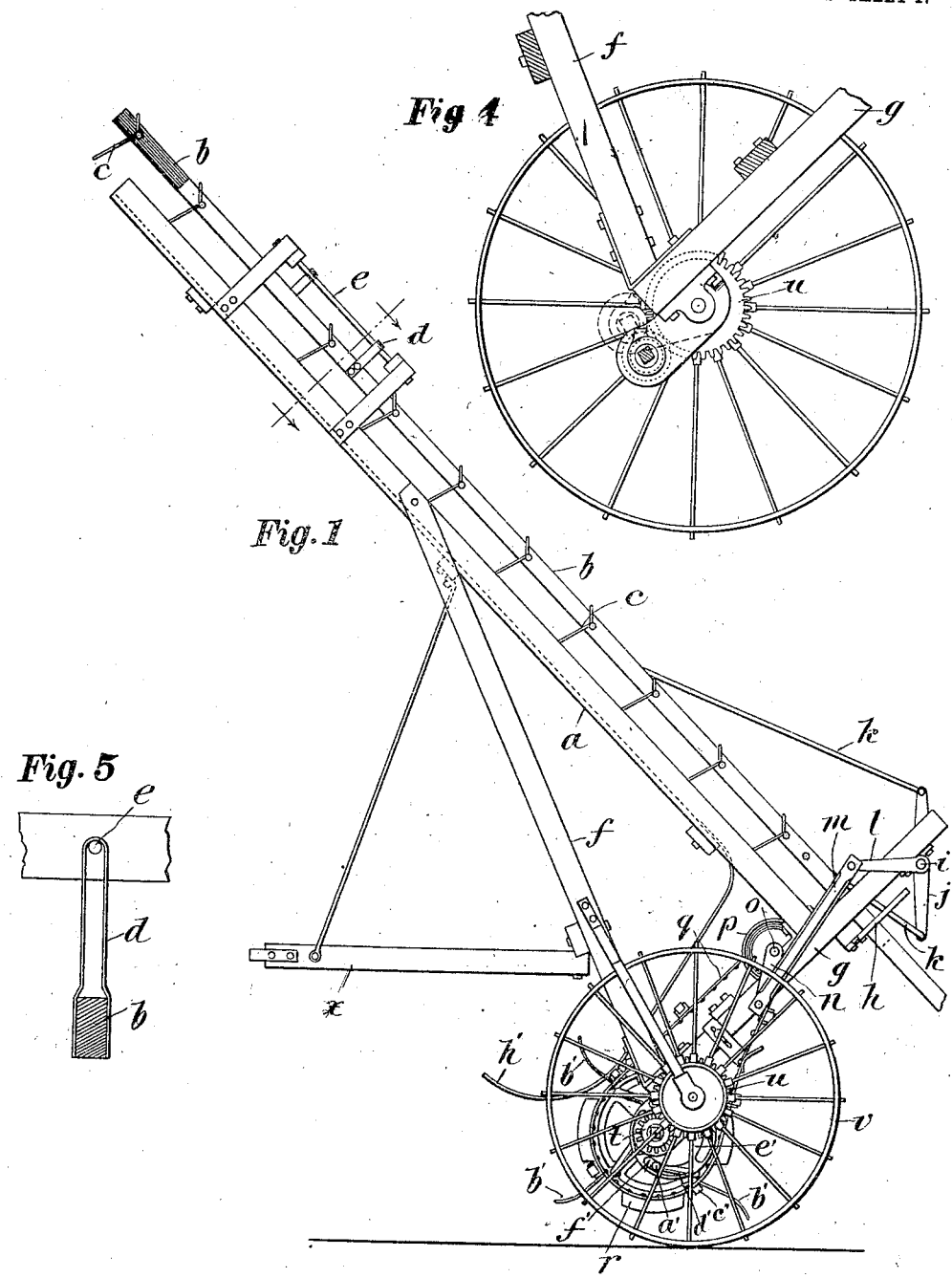
Figure 2:
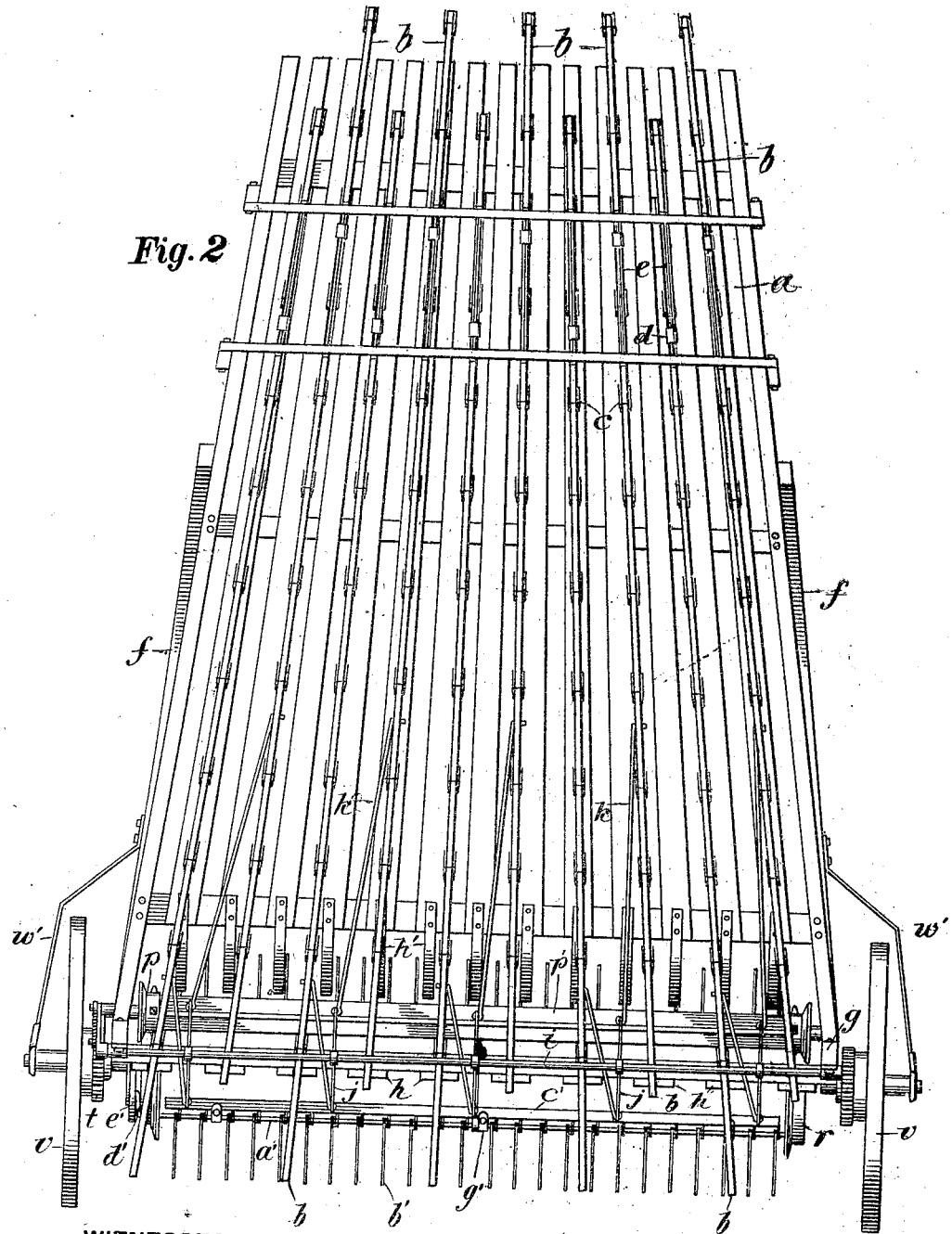

In the acccompanying drawings, Figure 1 is a side elevation of a hay-loader involving the features of the invention. Fig. 2 is a rear elevation thereof. Fig. 3 is a sectional elevation looking from the front of the machine. Fig. 4 is a detail view of one of the traction-wheels and the driving-gearing coöperating therewith. Fig. 5 is a detail view showing the mode of suspending the forward end of the reciprocating rakes.

Referring to the drawings, $a$ indicates the deck, which follows the usual construction in this type of machine and consists of a framework having a series of longitudinal slats forming a platform over which the hay is advanced progressively by the rakes until it is forced over the upper end of said deck and dropped upon the wagon. The rakes $b$, which coöperate with the deck, are also of the ordinary well-known type of reciprocating or "walking" rakes and consist of longitudinal bars $b$, each having a series of pendent spring-teeth $c$ attached throughout its length, which are relatively rigid against movement in the direction of the advance of the bars $b$, but which swing freely in a reverse direction when the bars are retracted, as will be well understood by those skilled in the art. The rear ends of the bars $b$ slide over a suitable cross-brace connecting the side frames of the machine and are accurately guided and spaced by means of the distance-pieces $h$ secured to said cross-braces, while the forward ends of the rakes are suspended and guided by swinging bales $d$, attached to the respective bars $b$ and engaging guide-rods $e$, mounted above and parallel with the deck.

The deck $a$ is supported by a framework consisting of side members $f$ and $g$, which are strengthened by suitable cross-braces at appropriate intervals, and between the side members $f$ is secured the tongue or rod by means of which the machine is attached to a wagon, as will be well understood.

The framework of the machine is supported upon traction-wheels $v$, which are mounted upon stub-axles $w$, secured to the framework at the junction of the side members $f$ and $g$ on the respective sides of the machine, said stub-axles being strengthened by braces $w'$, attached to the ends of said axles and to the side members $f$ of the machine-frame.

Journaled in the machine-frame, between the traction-wheels $v$, in suitable journal-brackets $s$ is a gathering-cylinder, which serves to take the hay from the ground as it is left by the mower. The rotary gatherer consists of a reel-like structure having end heads $r$, centrally journaled in the brackets $s$, which heads are connected by longitudinal shafts or bars $a'$, preferably four in number, one end of each of said bars being journaled in the left-hand head $r$ and the other end thereof passing through the right-hand head and being provided with a cranked portion $d'$, which engages a corresponding slot $f'$ in a stationary cam $e'$, located eccentrically on the bearing-bracket $s$, so that as the reel of the gathering-cylinder rotates the longitudinal bars $a'$ will be given a partial rotation for a purpose to be hereinafter more fully described. Rigidly secured to the longitudinal bars $a'$ of the reel is a series of rake-heads $c'$, each of which is attached to its corresponding supporting-bar $a'$ by clips $g'$, so that as the bar $a'$ is rotated the head $c'$ moves therewith. Secured to each of the heads $c'$ is a series of forwardly-curved spring rake-teeth $b'$, each of which has a coiled section encircling the bar $a'$.

Rotary motion is imparted to the gathering-cylinder from the traction-wheels $b$ by means of gears $u$, attached to the hubs of the respective wheels, which mesh with pinions $t$ on the end of the stub-shafts projecting from the heads $r$ and journaled in the brackets $s$.

The peripheral edges of the reel-heads $r$ are provided with sprocket-teeth, with which cooperate the drive-chains $q$ of an endless conveyer which passes over an idler-reel mounted in the machine-frame just below the rear edge of the deck $a$, said idler-reel consisting of a shaft $o$, sprocket-wheels $p$, and intermediate connecting members $p'$. Between the sprocket-chains, which are located on opposite sides of the reel, are a series of strand-wires $q''$, which form the body of the conveyer and which pass around the rotary gathering-cylinder, engaging the longitudinal bars $a'$ thereof between the rake-teeth $b'$ and also encircle the intermediate portion $p'$ of the idler-reel. Secured to the strand-wires $q''$ are a series of transverse slats $q'$, which are attached at their outer ends to the sprocket-chain and which constitute, with the strand-wire aforesaid, a lattice-like continuous apron or belt conveyer. It will be noted that the strand-wires $q''$ and the cross-slats $q'$ are so located with respect to the rake-teeth on the gathering-cylinder that as the latter rotates the teeth will clear the cross-slats on the delivery side of the conveyer and pass out behind the slats on the opposite side, and to insure the teeth $b'$ clearing the cross-slats and also to prevent said teeth pulling the hay through the open meshes of the conveyer the rake-heads $c'$ and the teeth $a'$, attached thereto, are given a partial rotation to draw the teeth partly within the reel member of the gatherer by means of the crank members $d'$ of the longitudinal bars $a'$, which engage the slot $f'$ in the eccentric cam $e'$, thereby rocking the shafts $a'$ and the attached rake-heads $c'$ sufficiently to retract the teeth $b'$ until they clear the slats $q'$ of the conveyer immediately adjacent to said teeth. The continued rotation of the gatherer-reel causes the teeth which have just cleared the delivery side of the conveyer to be projected behind the cross-slat on the opposite side of the conveyer, and as the cranked portions of the supporting-shaft $a'$ pass on into engagement with the section of the cam $e'$ nearer the center of rotation of the reel it will be seen that the teeth $b'$ will be gradually projected through the meshes of the conveyer and with a sweeping motion take the loose hay from the ground and deposit it upon the delivery side of said conveyer. The proper delivery of the hay from the rake-fingers of the rotary gatherer to the conveyer is insured by suitable guard-fingers $h'$, which overlie the conveyer and also serve to prevent the hay slipping or being blown off the conveyer.

Alternate reciprocatory motion may be imparted to the rakes which operate over the deck to advance the hay along the latter by any appropriate means. A simple and efficient connection to accomplish this operation is illustrated in the drawings and consists of a transverse shaft $i$, mounted upon the side frame members $g$ and having mounted thereon at appropriate intervals rock-levers $j$, each of which is connected by suitable pitmen $k$ with two adjacent reciprocating rakes, so that as one of said rakes is advanced the other is correspondingly retracted. Mounted upon the end of the rock-shaft $i$ is a crank $l$, which is connected by a pitman $m$ to a shorter crank $n$ on the end of the idler-reel shaft $o$, so that as the latter is rotated by the advance of the conveyer oscillatory motion is imparted to the shaft $i$ and correspondingly to the rock-levers $j$, fast thereon, which in turn alternately advance and retract the rakes over the deck.

The loader is attached to a wagon in the ordinary way, and as it is advanced over the field in which the hay has been left by the mower the rotation of the traction-wheels drives the gathering-cylinder through the intermediate gearing $u$ and $t$, and as said cylinder rotates the spring rake-teeth carried thereby are alternately advanced and retracted through the coöperation of the cranked shafts $a'$, supporting the rake-heads and the stationary cam $e'$. The conveyer, which receives the hay from the rake-fingers of the gathering-cylinder, is itself driven directly from the gathering-cylinder and in turn imparts the proper reciprocatory motion to the deck-rakes through the rotary crank $n$, pitman $m$, oscillatory crank $l$, and rock-levers $j$, connected to said rakes.

Having thus described my invention, what I claim is—

1. In a hay-loader, an inclined deck, oppositely-reciprocating rakes operating over said deck, a rotary gathering-cylinder having rake-teeth moving in a forward direction over the ground for taking the hay from the ground, and a conveyer between the deck and gathering-cylinder for delivering the hay to the rakes.

2. In a hay-loader, an inclined deck, oppositely-reciprocating rakes operating over said deck, a rotary gathering-cylinder having rake-teeth moving in a forward direction over the ground for taking the hay from the ground, a conveyer between the deck and the gathering-cylinder for delivering the hay to the rakes, and means operated by the traction-wheels for driving the gathering-cylinder, the conveyer and the rakes.

3. In a hay-loader, an inclined deck, oppositely-reciprocating rakes operating over said deck, a rotary gathering-cylinder for taking the hay from the ground, having a series of horizontal rake-heads provided with spring rake-teeth, the said teeth moving in a forward direction over the ground and a conveyer between the deck and the gathering-cylinder for delivering the hay to the rakes.

4. In a hay-loader, an inclined deck, oppositely-reciprocating rakes operating over said deck, a rotary gathering-cylinder for taking the hay from the ground, having a series of horizontal rake-heads provided with springrake-teeth, crank-shafts upon which said rake-heads are hung, a cam for rocking said shafts to vary the inclination of the spring-teeth as the cylinder revolves, and a conveyer between the deck and the gathering-cylinder for delivering the hay to the rakes.

5. In a hay-loader, an inclined deck, oppositely-reciprocating rakes operating over said deck, a rotary gathering-cylinder for taking the hay from the ground, having a series of horizontal rake-heads provided with spring rake-teeth, crank-shafts upon which said rake-heads are hung, a cam for rocking said shafts to vary the inclination of the spring-teeth as the cylinder revolves, an endless conveyer having strand-wires passing over the gathering-cylinder between the spring-teeth, and cross-slats secured to said strand-wires, said conveyer serving to transfer the hay from the teeth of the gathering-cylinder to the rakes on the deck.

6. In a hay-loader, an inclined deck, oppositely-reciprocating rakes operating over said deck, and a gathering-cylinder for taking the hay from the ground comprising rotary heads, crank-shafts between said heads, horizontal rake-heads on said shafts and having spring-teeth and a stationary cam coöperating with said shafts to rock the latter and thereby vary the inclination of the spring-teeth.

7. In a hay-loader, an inclined deck, oppositely-reciprocating rakes operating over said deck, a gathering-cylinder for taking the hay from the ground comprising rotary heads on said shafts and crank-shafts between said heads, horizontal rake-heads having spring-teeth and a stationary cam coöperating with said shafts to rock the latter and thereby vary the inclination of the spring-teeth, and a conveyer for delivering the hay from the gathering-cylinder to the rakes on the deck, said conveyer comprising sprocket-chains engaging the heads of the gatherer-cylinder, an idler-reel coöperating with said chains, strand-wires engaging the gatherer-cylinder and the idler-reel, and cross-slats attached to said strand-wires and the sprocket-chains.

8. In a hay-loader, an inclined deck, oppositely-reciprocating rakes operating over said deck, a gathering-cylinder for taking the hay from the ground comprising rotary heads on said shafts and crank-shafts between said heads, horizontal rake-heads having spring-teeth, and a stationary cam coöperating with said shafts to rock the latter and thereby vary the inclination of the spring-teeth, a conveyer for delivering the hay from the gathering-cylinder to the rakes on the deck, said conveyer comprising sprocket-chains engaging the heads of the gatherer-cylinder, an idler-reel coöperating with said chains, strand-wires engaging the gatherer-cylinder and the idler-reel, and cross-slats attached to said strand-wires and sprocket-chains, gearing connecting the traction-wheels with the gathering-cylinder for driving the latter and the conveyer, and means connecting the idler-reel with the rakes on the deck for reciprocating the latter.

In testimony whereof I affix my signature in presence of two witnesses.

EDWARD A. JOHNSTON

Witnesses:
E. R. THOMPSON,
T. B. PRERICHS.